Figure 1:
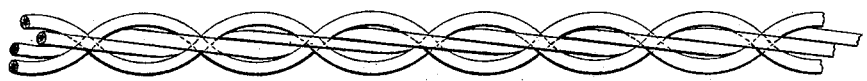

(No Model.) 2 Sheets—Sheet 1.

S. F. SHELBOURNE.
INSULATED ELECTRIC CONDUCTOR OR CABLE.

No. 297,175. Patented Apr. 22, 1884.

Witnesses:
John Buckler
Geo. P. West

Inventor:
Sidney F. Shelbourne

N. PETERS, Photo-Lithographer, Washington, D. C.

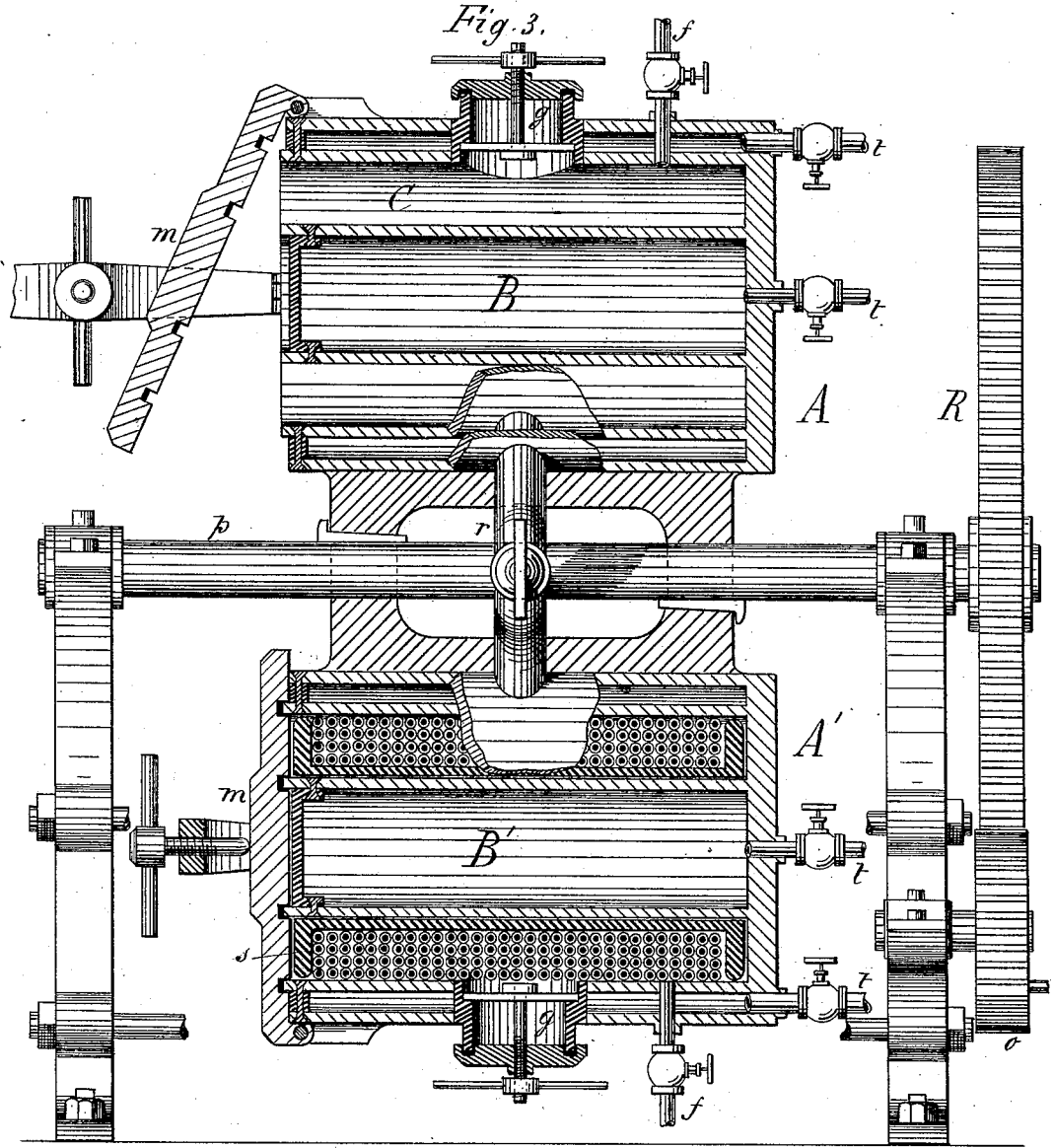

UNITED STATES PATENT OFFICE.

SIDNEY F. SHELBOURNE, OF NEW YORK, N. Y.

INSULATED ELECTRIC CONDUCTOR OR CABLE.

SPECIFICATION forming part of Letters Patent No. 297,175, dated April 22, 1884.

Application filed June 11, 1883. (No model.)

*To all whom it may concern:*

Be it known that I, SIDNEY F. SHELBOURNE, a citizen of the United States, residing in the city of New York, in the State of New York, have invented certain new and useful Improvements in Insulated Electric Conductors or Cables, more especially adapted for use in telephonic transmission; and I do hereby declare that the following is a full, clear, and exact description of the invention, which will enable others skilled in the art to which it appertains to make and use the same.

The great object sought to be attained in most of the inventions appertaining to electric cables of numerous wires, especially such as are designed for use under ground and in telephonic transmission, is to prevent the interference with each individual current of currents by induction, due to the passing of currents in contiguous wires and the near presence and influence of the great reservoir of magnetism—the earth—which itself gives origin to the most powerful and baffling effects of derived currents.

In patents of the United States Nos. 275,424 and 275,425, granted to me, I have shown a successive circumferential series of spiral wires, the wires of each series crossing those of the next adjacent series, and in each added division of cables providing that the spirals of the same relative series of wires are made to pass in a reverse direction, or, in other words, from left to right, or right to left, as the case may be. While in those patents the connections of the wires from one division of the cable to the adjacent division may be varied almost infinitely, so as to throw any two or more wires out of relations of parallelism to each other between each of the successive divisions of the cable, or reverse the spirals of each individual wire at will in each alternate division, it will be observed, nevertheless, that the wires of identical series in one and the same division of the cable are parallel to each other for the length of that division. While this arrangement and variable connection of the wires are adequate to answer and fulfill the chief function of counteracting inductive influence between the wires when most or all of the wires are receiving and passing currents in diverse directions at the same time, yet a still more perfect solution and obviation of the difficulties of inductive influence due to the near action of the earth's magnetism upon the passing currents is the object sought in greater perfection and the subject of the present invention. To accomplish this greater perfection in the construction of electric cables, for the purpose of obviating more completely the effects of induction, each wire, as represented in any one division of the cable, as shown in my Patent No. 275,424, has substituted for it a braid or a strand of wires composed of four separate insulated conductors interwoven, two opposite each other, and the pairs in planes substantially at right angles, the individual wires of such strand each being insulated from the other wires of the same strand or the same cable or division thereof by a heavy or double coating of coarse jute fiber, which is saturated with a proper preserving and insulating material.

Referring to the drawings herewith, Figure 1 represents a cable strand composed of four such insulated wires maintaining a relation to each other in pairs and in planes of right angles, as explained. In this figure, as also in Fig. 2, the wires in the braids are shown in lines more curved and open than will occur in practice, in order that the details of the drawings may not be confused and blended. It will be seen by Fig. 1 that the wires cross each other continuously at each step or link of the braid, and parallelism between any two wires, both in each braid and in the whole cable, is completely obviated.

Figure 2:
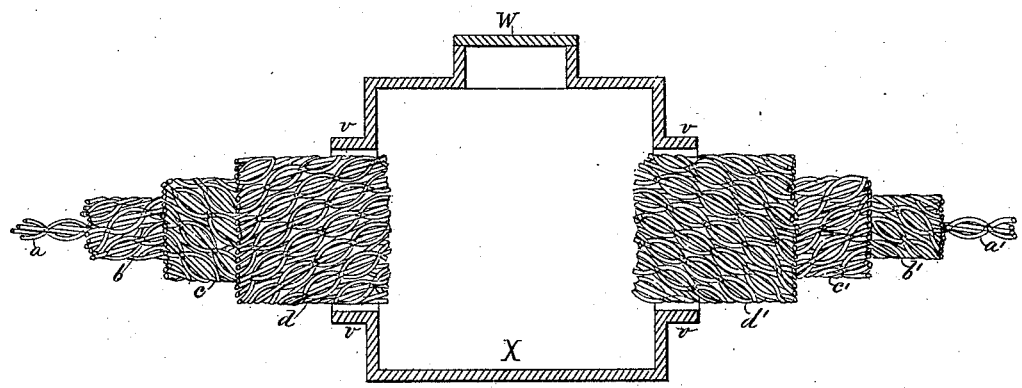

In Fig. 2 is shown portions of two adjacent divisions of the cable entering the opposite sides of a test or distributing box, each portion being represented as composed of four different circumferential series of braids of wires alternately passing in spirals of opposite directions, and the same relative series of braids having its spirals reversed in contiguous divisions of the cable. Thus $a$, Fig. 2, represents the central or core braid, which may as well be composed of three or four braids twisted together, $b$ represents the next series, and $c$ the third series, the spirals of which pass in opposite directions to those in $b$, while $d$ represents the outer series of braids passing in spirals opposite to those in $c$. At $d'$, $c'$, $b'$, and a' are shown the series of braids in the contiguous and succeeding division of the cable, in which the spirals of the same relative series of braids are reversed or changed with reference to those in a, b, c, and d. There is shown at X a test or connecting and distributing box, with its man-hole and cover W and its neck-flanges V V V V, for receiving and securing the ends of the cables.

Fig. 3, Sheet 2, shows a construction of apparatus by which the insulation of the covered wires and strands of the cable is effected. In this figure, A' A' represent two reversible drums, each composed of a central cylinder, B or B', an annular insulating-space, C, which in the lower drum of the drawings is shown as occupied with the spool S, containing the fiber-covered wires to be insulated, and also a steam-jacketed cylinder inclosing this annular space. The pipes t t t t are shown to enter the steam-containing portions of the apparatus, while the pipes f f are for conveying air out of or into the annular insulating-spaces, which are also connected with each other by the valve-regulated pipe r. The doors m m allow of access to these annular spaces, and serve to confine them when in operation. The drums, as described, are carried opposite to each other on a shaft, P, supported in a suitable frame at a proper height from the floor or ground to permit the one or the other in turn to occupy a position above or below the shaft. The drums are reversed in position above and below the shaft P by means of the spur-wheel R and pinion O, which has a handle to operate it.

At g g are shown openings into the annular spaces of the drums of considerable size, through which, when uppermost, the annular space C is filled with insulating material.

The employment and operation of the apparatus are as follows: The wires are wound to the desired thickness with the jute fiber. In this condition it would be a slow, uncertain, and imperfect process to insulate them by steeping them in a melted insulating material, for the reason that minute air particles adhere with considerable tenacity to the minute filaments within the body of the fiber. To accomplish the insulation rapidly and thoroughly, the covered wires, before or after twisting or braiding, are wound loosely upon spools S, fitting within the annular spaces of the apparatus. A spool of wire is then placed in the lower of the two drums, while the annular space C of the upper one is filled with insulating material. Steam being let in through the pipes t t t t, both drums are heated alike. The insulating material is liquefied in the upper one, and the wire and its covering fiber in the lower one become also hot, so as to expand the air within the annular space and in the fiber of the wire-covering, and also convert into vapor any moisture which may inhere in the fibers. The air is then exhausted from the lower annular space, thus drying perfectly the fibers about the wires and leaving vacant the microscopic spaces within the fiber-covering which had previously contained the adhering air particles. The connection from the upper to the lower cylinder is now opened, and the hot insulating material rushes down and fills the lower annular space, saturating the fibers, covering the wires thoroughly to the metal. An air-pressure may now be applied through the upper pipe, f, to compel the immediate and thorough performance of the object desired. The drums being now again reversed, the surplus insulating material drains back into the cylinder originally containing it, and the door m being opened, the spool of wires is taken out and the wires passed through dies to further condense and uniform their coatings of insulation. The wires as thus prepared may then be formed into cables of interwoven strands, as shown, in circumferential series of opposite spirals, or as single wires of like series of spirals, as shown in Patent No. 275,424, issued to me April 10, 1883.

While the apparatus, as here shown in its details, may be best adapted to accomplish the objects desired, there are evidently other mechanical means which may be employed to carry out in result the same principles and process of insulating fiber-covered wires, strands, or cables; and I do not limit myself to the precise apparatus and manipulation here explained, since the important facts concerned in the process relate to the previous treatment of the fibers about the wires by withdrawing from their minute filaments the tenaciously-adhering air particles which would otherwise prevent the proper insulation of the conductors—an important step never heretofore taken. In forming these conductors into cables, it is obvious that, so far as the objects sought to be accomplished by arranging the insulated wires or strands and braids of wires in series of spirals of opposite direction in each added circumferential outward series are concerned, it makes no difference in the scientific principles involved whether single insulated wires or strands of braids or twists are employed; nor are the object and effect of the invention altered by the use of any particular material of insulation for the wires or strands, whether they are separated and insulated on hard-rubber templets, as shown in Patent No. 275,424, granted to me, or by means of plastic rubber, gutta-percha, or other equivalent material, instead of insulation-saturated jute, as explained herein. I may therefore carry out the legitimate objects to be accomplished by the arrangement of right and left hand spirals in successive outward series by employing any number of wires either in strand or series, always guarding that each wire or single conductor in the whole cable or series of conductors is separated laterally and prevented from metallic contact with every other conductor in the spiral series or cable by any desirable and competent insulation.

As the apparatus herein described for insulating the wires, strands, and cables may be advantageously employed generally in the manufacture of fiber-covered electric conductors, and cables of various construction composed of such conductors, I do not limit such apparatus to the particular cables I have herein described, and therefore do not claim specifically herein such apparatus, but reserve the subject-matter of that part of my invention for a separate application.

What is claimed as new is—

1. A cable for electric uses, composed of a group or circumferential series of insulated conductors, or strands of conductors, each series in outward progression resting by the several insulations of its wires upon the next interior series, and passing in spirals opposite in direction to those of such interior series, for the purpose and substantially as described.

2. An electric cable composed of strands of insulated conductors interwoven with each other in pairs, and arranged in circumferential layers or series, each outward series passing in spirals of opposite direction to those of the adjacent interior series, as and for the purpose set forth.

3. The electric conducting-line made up of cable-sections, each section formed of groups or strands of conductors arranged in circumferential series, as described, the spiral of the strands or series in one section passing in opposite spirals to those of the corresponding strands or series in the adjoining section, and being united variably in the test-boxes, as set forth.

In testimony of which I have hereunto subscribed my name, in the presence of two witnesses, this 9th day of June, 1883.

SIDNEY F. SHELBOURNE.

Witnesses:
FRANK S. TYLER,
E. T. HURRY.